United States Patent [19]

Hert

[11] Patent Number: 4,990,566

[45] Date of Patent: Feb. 5, 1991

[54] CROSSLINKED POLYMER COMPOSITIONS, A PROCESS FOR THEIR PRODUCTION AND MOULDED ARTICLES OBTAINED

[75] Inventor: Marius Hert, Verneuil en Halatte, France

[73] Assignee: Norsolor, Cedex, France

[21] Appl. No.: 338,662

[22] Filed: Apr. 17, 1989

[30] Foreign Application Priority Data

Apr. 18, 1988 [FR] France .................. 88 05066

[51] Int. Cl.$^5$ .............. C08L 35/00; C08L 33/04; C08L 23/26
[52] U.S. Cl. .................. 525/179; 525/194; 525/207; 525/327.4; 524/517
[58] Field of Search ............ 525/194, 207, 327.4, 525/179

[56] References Cited

U.S. PATENT DOCUMENTS

| | | | |
|---|---|---|---|
| 3,383,372 | 5/1968 | Spivey .................. | 260/86.7 |
| 3,408,337 | 10/1968 | Moore .................. | 525/327.4 |
| 3,998,994 | 12/1976 | Decroix et al. | |
| 4,612,349 | 9/1986 | Nicco et al. .......... | 525/117 |
| 4,619,969 | 10/1986 | Doi et al. ............. | 525/207 |
| 4,686,257 | 8/1987 | Mitsuno et al. ...... | 525/207 |
| 4,696,967 | 9/1987 | Shedd et al. ......... | 524/437 |
| 4,758,629 | 7/1988 | Deyrup et al. ....... | 525/194 |
| 4,782,110 | 11/1988 | Wolfe ................... | 525/194 |
| 4,820,774 | 4/1989 | Takao et al. ......... | 525/227 |

FOREIGN PATENT DOCUMENTS

WO86/06395 11/1986 European Pat. Off. .
0204453 12/1986 European Pat. Off. .

OTHER PUBLICATIONS

Coran—Thermoplastic Elastomers—Chap. 7, pp. 135–137, N. R. Legge et al.—Munich, Germany, Hanser Pub., 1987.

*Primary Examiner*—Carman J. Securro
*Attorney, Agent, or Firm*—Finnegan, Henderson, Farabow, Garrett & Dunner

[57] ABSTRACT

Polymer composition based on a mixture of 15 to 50% by weight of a propylene polymer and of 50 to 85% by weight of a flexible ethylene copolymer. The flexible ethylene copolymer is either a terpolymer (A) comprising from 83 to 92.7 mol % of ethylene, from 7 to 14 mole % of at least one alkyl (meth)acrylate, whose alkyl group has from 1 to 8 carbon atoms and from 0.3 to 3 mol % of at least one unsaturated dicarboxylic anhydride, or a mixture comprising, for 100 parts by weight, at least 70 parts by weight of the terpolymer (A) and at most 30 parts by weight of at least one copolymer (B) selected from ethylene copolymers comprising from 86 to 93 mol % of ethylene and from 7 to 14 mol % of at least one copolymerizable monomer selected from alkyl (meth)acrylates whose alkyl group has from 1 to 8 carbon atoms and ethylene copolymers comprising 92 to 98 mol % of ethylene and from 2 to 8 mol % of at least one $C_3$-$C_{10}$ α-olefin, the said ethylen/α-olefin copolymers having a density in the range of 0.875 to 0.905, and the said terpolymer (A) having undergone at least a partial dynamic crosslinking, using a crosslinking agent containing at least one functional group capable of reacting with the anhydride functional group of the said terpolymer (A). Application to the production of moulded articles.

14 Claims, No Drawings

CROSSLINKED POLYMER COMPOSITIONS, A PROCESS FOR THEIR PRODUCTION AND MOULDED ARTICLES OBTAINED

The present invention relates to a polymer composition based on at least one propylene polymer mixed with at least one flexible ethylene copolymer, the ratio by weight of the propylene polymer(s) to the flexible ethylene copolymer(s) being in the range 15:85 to 50:50. The present invention also relates to a production process for this composition and to the moulded articles obtained from the latter.

"Flexible ethylene copolymers" is understood to mean essentially terpolymers of ethylene, alkyl (meth)acrylate and unsaturated dicarboxylic anhydride, containing more than 83 mol % of ethylene, and having a flexural modulus of elasticity less than 100 MPa and, preferably, less than 30 MPa.

The polymer compositions, also occasionally designated below by the term "alloys", comprising the mixtures of polypropylene with the terpolymers mentioned above are known from the European Patent No. 0,221,919. These alloys have the following disadvantage: when the terpolymer content exceeds 50% by weight, their morphology develops towards interpenetrating phases, then towards a morphology having a terpolymer matrix and polypropylene nodules. Now, in the domain of the interpenetrating phases, the morphologies are sensitive to shearing gradients which can be applied in later use, and the mechanical properties of the alloy are generally poor and hardly reproducible.

Additionally, crosslinked polymers of ethylene and an unsaturated dicarboxylic anhydride, optionally with another comonomer, are known particularly from the French Patent No. 2,131,540 and from the U.S. patent application No. 4,612,349.

The Applicant Company has now confirmed that when terpolymers of the type defined above are subjected to at least partial chemical crosslinking during the production of alloys with propylene polymers, meaning during the kneading of the two polymer constituents, polymer compositions are obtained from which the defects mentioned above are eliminated. This method of crosslinking is designated in what follows as being a "dynamic crosslinking".

The polymer compositions which result are characterized by a non-progressive morphology during later use by injection or extrusion and are characterized by improved mechanical properties. They are also distinguished by having an improved thermal behaviour, characterized by the increase in the Vicat softening temperature, or by the increase in the torsion modulus of elasticity. Their elastic memory is improved and is manifest in a lower compression set (generally between about 55% and 80% in accordance with the standard ASTM D395 after 22 hours at 70° C.).

Moreover, these polymer compositions are distinguished from those described in the European Patent Application No. 204,453, in which the flexible ethylene copolymer is also subjected to a dynamic crosslinking, among other differences, by the replacement of the acrylic acid by an unsaturated dicarboxylic anhydride, which has the advantage of promoting an improved compatibility between the propylene polymer and the flexible ethylene copolymer.

The present invention relates to a polymer composition based on a mixture of:

about 15 to 50% by weight of a propylene polymer; and about 50 to 85% by weight of a flexible ethylene copolymer, characterized by the fact that the said flexible ethylene copolymer is a terpolymer (A) comprising:

from about 83 to 92.7 mol % of ethylene, from about 7 to 14 mol % of at least one alkyl acrylate, whose alkyl group has from 1 to 8 carbon atoms; and from about 0.3 to 3 mol % of at least one unsaturated dicarboxylic anhydride; or else a mixture comprising, for 100 parts by weight, at least about 70 parts by weight of the terpolymer (A) and at most about 30 parts by weight of at least one copolymer (B) selected from ethylene copolymers comprising:

from about 86 to 93 mol % of ethylene; and from about 7 to 14 mol % of at least one copolymerizable monomer selected from alkyl (meth)acrylates whose alkyl group has from 1 to 8 carbon atoms; and ethylene copolymers comprising:

about 92 to 98 mol % of ethylene; and from about 2 to 8 mol % of at least one $C_3$-$C_1$ α-olefin, the said ethylene/α-olefin copolymers having a density in the range of about 0.875 to 0.905, the terpolymer (A) having undergone at least a partial dynamic crosslinking, using a crosslinking agent containing at least one functional group capable of reacting with the anhydride functional group of the said terpolymer (A).

Preferably, the molar ratio of the reactive functional groups of the crosslinking agent to the anhydride groups of the terpolymer (A) is between 0.5 and 2.

The propylene polymers which may be used according to the present invention comprise particularly crystalline polypropylene, crystalline ethylene-propylene block copolymers or crystalline ethylene-propylene random copolymers, crystalline propylene-α-olefin copolymers, the olefin having from 4 to 10 carbon atoms, and mixtures of these polymers. These normally have a melt flow index lying between 0.5 and 20 dg/min., measured in accordance with the standard ASTM D1238, at 230° C., under 2.16 kg.

As alkyl acrylates from which polymers (A) and (B) may be constituted, may be mentioned particularly nbutyl acrylate, ethyl acrylate, 2-ethylhexyl acrylate and isobutyl acrylate.

As unsaturated dicarboxylic anhydrides from which the terpolymers (A) are constituted, may be mentioned maleic anhydride, itaconic anhydride and phthalic anhydride, more particularly, maleic anhydride.

In accordance with a first embodiment of the invention, the crosslinking agent contains at least one epoxide group.

The crosslinking agent may thus be a polyepoxide compound of the general formula:

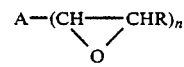

in which A is a polyfunctional group of valence $n \geq 2$ and R is a hydrocarbon radical or a hydrogen atom. Polyglycidyl ethers of polyhydroxyl-substituted compounds may be mentioned by way of examples. Among these, are chosen either polyepoxide compounds of the aromatic type (such as those derived from Bisphenol A), or polyepoxide compounds of the aliphatic type, particularly polyglycidyl ethers of polyalcohols, such as diglycidyl ethers of α-ω diols such as the diglycidyl ether of butanediol, of hexanediol, of paracyclohexyldimethanol, of neopentyl glycol, such as the triglycidyl ethers of triols such as trimethylolpropane triglycidyl ether, glycerol triglycidyl ether, such as the tetraglycidyl ethers of tetrols such as pentaerythritol tetraglycidyl ether. Among compounds originating from the epoxidation of olefinic compounds, epoxidized soya oil is advantageously selected.

It is also possible to use, as the crosslinking agent having epoxy functional groups, a copolymer of at least one $C_2$–$C_8$ olefin with at least one unsaturated monomer containing an epoxy group, such as particularly a glycidyl acrylate or a glycidyl methacrylate. A copolymer of this type can be obtained, either by grafting an unsaturated monomer onto the chain of the olefin (co)-polymer or directly by copolymerization of the unsaturated monomer with the $C_2$–$C_8$ olefin. A copolymer of this type may additionally comprise units derived from another unsaturated monomer such as an alkyl acrylate or an alkyl methacrylate. Such copolymers have been described particularly in the U.S. Pat. No. 3,383,372.

The epoxide crosslinking agents are advantageously combined with at least one activator of the reaction between their epoxide functional groups and the anhydride functional groups of the terpolymer (A). Such activators are well known and comprise for example tertiary amines, quaternary ammonium salts, triphenylphosphine, zinc alkyldithiocarbamates and methylimidazole. The molar ratio of the activating agent to the anhydride groups of the terpolymer (A) is generally at least equal to 0.5, preferably at least equal to 1.

As a particular epoxide crosslinking system, may be mentioned bisphenol A diglycidyl ether combined with a mixture of tertiary amines having 16 to 18 carbon atoms, known by the name of dimethylsulfamine.

In accordance with a second embodiment of the invention, the crosslinking agent contains at least two primary and/or secondary amine groups, preferably primary amine groups. By way of examples of such compounds, may be mentioned hexamethylenediamine, polyoxyethylenediamines, polyoxypropylenediamines, polyoxypropylenetriamines and diphenylsulfonediamine. Polyamides having free amine functional groups may also be mentioned.

Polyamides which can be used are particularly polyamides obtained from (a) 35 to 49.5 mol % of dimeric fatty acid, (b) 0.5 to 15 mol % of monomeric fatty acid having a chain length of 12 to 22 carbon atoms, and (c) 2 to 35 mol % of polyetheramine of the general formula: $H_2N$-$R_1O$-$(RO)_x$-$R_2$-$NH_2$ in which x represents a number between 8 and 80, particularly between 8 and 40; $R_1$ and $R_2$ represent aliphatic and/or cycloaliphatic hydrocarbon radicals, which may be identical or different; and R represents an aliphatic hydrocarbon radical which may be branched, having 1 to 6 carbon atoms, and (d) 15 to 48 mol % of aliphatic diamine containing 2 to 40 carbon atoms in the carbon skeleton, it being possible to replace the dimeric fatty acids to the extent of ⅔ by aliphatic dicarboxylic acids having 4 to 12 carbon atoms; and polyamides obtained from (a) 20 to 49.5 mol % of dimeric fatty acids, (b) 0.5 to 15 mol % of monomeric fatty acids having a chain length of 12 to 22 carbon atoms; and (c) up to 20 to 55 mol % of an amine having at least two primary amino groups and having 2 to 40 carbon atoms in the carbon skeleton, it being possible to replace the dimeric fatty acids to the extent of ⅔ by aliphatic dicarboxylic acids having 4 to 12 carbon atoms. These polyamides advantageously have terminal amino groups, their amine number being in the range 2 to 15, particularly 4 to 10.

In accordance with a third embodiment of the present invention, the crosslinking agent contains at least two alcohol or thiol functional groups. In particular, may be mentioned diols, such as ethylene glycol, propylene glycol and their polymers. The crosslinking agent may also simultaneously contain at least one alcohol or thiol functional group and at least one amine functional group. Diethanolamine and monoethanolamine may be mentioned as crosslinking agents of this type.

The compositions according to the invention generally have a content of materials which are extractable at 23° C. by cyclohexane, this content revealing their degree of crosslinking, and being between about 80% and 100%.

The composition according to the invention may contain up to about 20 parts by weight, per 100 parts by weight of total polymers, of at least one inorganic filler, selected particularly from mica, carbon black, chalk, talc and kaolin. It may also contain up to about 30 parts by weight, per 100 parts by weight of total polymers, of at least one plasticizing oil which is compatible with the ethylene copolymer. Among these plasticizers, may be mentioned paraffin oils and isoparaffin oils, naphthenic oils, aromatic oils and alkyl phthalates.

The production of polymer compositions of the invention is carried out by kneading the polymer constituents, the crosslinking agent and optional additives, in internal mixers or continuous kneaders having twin screws or co-kneaders, at a temperature generally of between 190° and 240° C., the residence time in the kneading apparatus being generally more than 2 minutes. The crosslinking agent may be introduced in the kneader by different known techniques. When the crosslinking agent is liquid, it may be introduced directly by pumping into the kneading apparatus or else a master-batch may be formed by dispersing this agent in the copolymer (B) in the case where such a copolymer is present; in the case where the crosslinking agent is a particulate material, it is possible to produce a coating of the polymer granules with a mixture of the said crosslinking agent and a particulate filler, such as chalk under cold conditions.

Finally, the invention also relates to moulded objects obtained from a composition of the type previously described, by a conversion technique, by injection moulding, extrusion, etc. Articles of this kind find particularly valuable application in the following areas:

Sheathing of cables and tubes by extrusion, bellows and connection pieces obtained by extrusion blow moulding, notably in the automobile industry, injection mouldings, and injection moulding seals.

The present invention will now be described in more detail with reference to examples and comparative examples. In the latter, the percentages are given by weight unless stated otherwise.

The melt flow indices of the propylene polymers have been calculated in accordance with the standard ASTM D1238, at the temperature indicated, under 2.16 kg.

The measurements of tensile strength and elongation at break were carried out in accordance with the standard ASTM D638: starting from a granular mixture obtained after kneading, 2 mm thick plaques are produced by injection moulding at a resin temperature of 220° C., from which tensile test pieces are cut; here, distinction is made between the cut in the injection direction (L) and the cut perpendicular to the injection direction (T).

The measurements of compression set were carried out in accordance with the standard ASTM D 395 after 22 hours at 70° C.

The measurements of Vicat softening temperature were carried out in accordance with the standard ASTM D1525.

The torsion modulus of elasticity at 100° was calculated in accordance with the standard ISO 150,527.

The crosslinking of the terpolymers (A) of the invention was revealed by extraction of the alloy with cyclohexane at 23° C. for 48 hours, followed by measurement of the content of extractable materials (gel) by evaporation of the solvent.

The results of the measurements carried out in Examples 1 to 5 and in the corresponding Comparative Examples are shown in Table 1.

COMPARATIVE EXAMPLE 1

In a BUSS PR 46 co-kneader are continuously mixed, at a temperature of 205° C., a propylene homopolymer having a melt flow index (MFI) of 4 g/10 minutes (at 230° C.), and a terpolymer comprising:
- 90.3 mol % of ethylene;
- 9.0 mol % of butyl acrylate, and
- 0.7 mol % maleic anhydride, this terpolymer having an MIF of 9.5 g/10 minutes (190° C.), a fusion temperature of 67° C. and a crystallinity less than 5%, the ratio by weight polypropylene/terpolymer being 50/50. This mixture is recovered in the form of granules.

EXAMPLE 1

The procedure of Comparative Example 1 is followed, except that 1% of diethanolamine relative to the terpolymer is incorporated in the polypropylene/terpolymer mixture.

COMPARATIVE EXAMPLE 2

The procedure of Comparative Example 1 is followed, except that the terpolymer is a terpolymer comprising:
- 89.4 mol % of ethylene;
- 9.2 mol % of ethyl acrylate; and
- 1.2 mol % of maleic anhydride, and having an MFI of 33.2 g/10 minutes (at 190° C.), and a fusion temperature of 70° C.

EXAMPLE 2

The procedure of Comparative Example 2 is followed, except that 1% of diethanolamine relative to the terpolymer is incorporated in the polypropylene/terpolymer mixture.

COMPARATIVE EXAMPLE b 3

The procedure of Comparative Example 2 is followed, except that the ratio by weight polypropylene/terpolymer is 30/70.

EXAMPLE 3

The procedure of Comparative Example 3 is followed, except that 1% of diethanolamine relative to the terpolymer is incorporated in the mixture.

COMPARATIVE EXAMPLE 4

In a BUSS PR 46 mixer, are mixed, at a temperature of 205° C., 50 parts of a random propylene copolymer, having a fusion temperature of between 150° and 158° C. and an MFI of 10–15 g/10 minutes (at 230° C.), and 50 parts of the terpolymer defined in Comparative Example 2.

EXAMPLE 4

The procedure of Comparative Example 4 is followed except that the 50 parts of terpolymer are replaced by a mixture of:
- 40 parts by weight of the terpolymer defined in Comparative Example 2; and
- 10 parts by weight of the copolymer comprising:
  - 91.4 mol % of ethylene; and
  - 8.6 mol % of n-butyl acrylate, into which mixture are incorporated 4 parts by weight of diethanolamine per 100 parts by weight of the copolymer previously mentioned.

COMPARATIVE EXAMPLE 5

The procedure of Comparative Example 4 is followed except that the ratio by weight of the polypropylene/terpolymer mixture is 30/70.

EXAMPLE 5

The procedure of Example 4 is followed except that the ratio by weight of the mixture polypropylene/terpolymer/copolymer is 30/56/14.

TABLE 1

| | Comp. Ex. 1 | Ex. 1 | Comp. Ex. 2 | Ex. 2 | Comp. Ex. 3 | Ex. 3 | Comp. Ex. 4 | Ex. 4 | Comp. Ex. 5 | Ex. 5 |
|---|---|---|---|---|---|---|---|---|---|---|
| Tensile strength (in MPa) | | | | | | | | | | |
| L | 14.4 | 18.3 | 14.8 | 20.0 | 10.2 | 14.2 | 13.0 | 16.9 | 9.9 | 12.5 |
| T | 11.4 | 18.4 | 10.7 | 16.4 | 5.9 | 10.4 | 9.3 | 20.6 | 10.2 | 15.1 |
| Elongation (%) | | | | | | | | | | |
| L | 96 | 184 | 68 | 246 | 94 | 162 | 125 | 341 | 220 | 241 |
| T | 379 | 426 | 107 | 295 | 52 | 187 | 160 | 684 | | |
| Vicat softening temperature (°C.) | 72 | 97 | 60 | 104 | 42 | 62 | 68 | 81 | 52 | 62 |
| Shore hardness | | | 50D | 52D | 81A | 85A | 75A | 80A | 72A | 79A |
| Gel con- | | | | | | | | 65 | | 96 |

TABLE 1-continued

| | Comp. Ex. 1 | Ex. 1 | Comp. Ex. 2 | Ex. 2 | Comp. Ex. 3 | Ex. 3 | Comp. Ex. 4 | Ex. 4 | Comp. Ex. 5 | Ex. 5 |
|---|---|---|---|---|---|---|---|---|---|---|
| tent (%) | | | | | | | | | | |

COMPARATIVE EXAMPLE 6

In a BUSS kneader, are mixed, at a temperature of 205° C., the polypropylene of Example 4 and the ethylene-ethyl acrylate-maleic anhydride terpolymer of Example 1.

The results of the measurements carried out are shown in Table 2.

EXAMPLE 6

The procedure of Comparative Example 6 is followed, except that to the mixture based on the polypropylene of Example 4 and on the terpolymer of Example 1 are added:

3% of bisphenol A diglycidyl ether (molecular weight 340) relative to the terpolymer; and
3% of dimethylsuifamine (sic) relative to the terpolymer.

The results of the measurements carried out are shown in Table 2.

TABLE 2

| | Comp. Ex. 6 | Ex. 6 |
|---|---|---|
| Compression set (70° C., 22 hours) | 100 | 77 |
| Tensile strength (L) (MPa) | 13 | 17 |
| Gel content (%) | 70 | 97 |

The results of the measurements carried out in Examples 7 to 10 and in the corresponding Comparative Examples are shown in Table 3.

COMPARATIVE EXAMPLE 7

The process of Comparative Example 1 is followed, except that the ratio by weight polypropylene/terpolymer is 40/60.

EXAMPLE 7

The procedure of Comparative Example 7 is followed, except that a polypropylene/terpolymer/diethanolamine mixture is used in a ratio by weight of 39/60/1.

COMPARATIVE EXAMPLE 8

The procedure of Comparative Example 1 is followed, except that the ratio by weight polypropylene/terpolymer is 20/80.

EXAMPLE 8

The procedure of Comparative Example 8 is followed, except that a polypropylene/terpolymer/copolymer of Example 4/diethanolamine mixture is used in ratio by weight of 20/64/15.35/0.65.

COMPARATIVE EXAMPLE 9

The procedure of Comparative Example 1 is followed, except that as propylene polymer, a homopolymer having an MFI of 12 dg/min (230° C.) and a fusion point of 168° C. is used, the ratio by weight polypropylene/terpolymer being 40/60.

EXAMPLE 9

The procedure of Comparative Example 9 is followed, except that the mixture having the following formulation is used:

| | |
|---|---|
| Polypropylene from Comp. Ex. 9 | 40 (% by weight) |
| Terpolymer from Comp. Ex. 9 | 42 |
| Linear ethylene-propylene-butene copolymer of density 0.900 g/cm³, of MFI 1.1 dg/min (190° C.) | 12 |
| Chalk | 3.6 |
| Epoxy resin | 2.1 |
| Dimethylsuifamine (sic) | 0.3 |

COMPARATIVE EXAMPLE 10

The procedure of Comparative Example 9 is followed, except that the ratio by weight polypropylene/terpolymer is 30/70.

EXAMPLE 10

The procedure of Example 9 is followed, except that the percentages by weight of the constituents of the mixture, taken in the same order, are as follows: 30;50;14;4.2;3.5;0.3.

TABLE 3

| | Comp. Ex. 7 | Ex. 7 | Comp. Ex. 8 | Ex. 8 | Comp. Ex. 9 | Ex. 9 | Comp. Ex. 10 | Ex. 10 |
|---|---|---|---|---|---|---|---|---|
| Tensile strength (in MPa) | | | | | | | | |
| L | 11.0 | 18.6 | 8.2 | 12.5 | 15.9 | 16.1 | 10.4 | 15.8 |
| T | 11.2 | 15.4 | 6.4 | 10.5 | 12.7 | 12.5 | 10.3 | 13.3 |
| Elongation at break (%) | | | | | | | | |
| L | 180 | 489 | 315 | 448 | 80 | 244 | 157 | 340 |
| T | | | | | 83 | 267 | | |
| Compression set (22 hours, 70° C.) (%) | 100 | 70 | 100 | 65 | 100 | 59 | 100 | 59 |
| Torsion modulus at 100° (in MPa) | 0.2 | 15 | <0.1 | 3 | | | | |
| Shore A hardness | 86 | 89 | | | 82 | | 98 | 96 |
| Gel content | 60 | 92 | | | | | | |

The results of the measurements carried out in Examples 11 and 12 and in the corresponding comparative examples are shown in Table 4.

COMPARATIVE EXAMPLE 11

The procedure of Comparative Example 1 is followed, except that the polypropylene of Example 4 is used.

EXAMPLE 11

The procedure of Comparative Example 11 is followed, except that a mixture is used having the following formulation:

| | |
|---|---|
| Polypropylene from Comp. Ex. 11 | 50 (% by weight) |
| Terpolymer from Comp. Ex. 11 | 40 |
| Ethylene/ethyl acrylate/glycidyl methacrylate (molar coposition 96/2/2), having an MFI of 8 dg/min (at 190° C.) | 10 |
| Dimethylsuifamine (sic) | 0.75 |

COMPARATIVE EXAMPLE 12

The procedure of Comparative Example 11 is followed, except that the ratio by weight polypropylene/terpolymer is 30/70.

EXAMPLE 12

The procedure of Example 11 is followed, except that the percentage by weight of the constituents of the mixture, taken in the same order, are the following: 30;56;14;1.0.

TABLE 4

| | Comp. Ex. 11 | Ex. 11 | Comp. Ex. 12 | Ex. 12 |
|---|---|---|---|---|
| Vicat softening temperature (°C.) | 68 | 97 | 52 | 60 |
| Compression set (22 hours, 70° C.) (%) | 100 | 75 | 100 | 65 |

I claim:

1. Polymer composition based on a mixture of:
   15 to 50% by weight of a propylene polymer; and
   50 to 85% by weight of a flexible ethylene copolymer,
   characterized by the fact that the said flexible ethylene copolymer is a terpolymer (A) comprising:
   from 83 to 92.7 mol % of ethylene,
   from 7 to 14 mol % of at least one alkyl (meth)acrylate, whose alkyl group has from 1 to 8 carbon atoms; and
   from 0.3 to 3 mol % of at least one unsaturated dicarboxylic anhydride; or
   a mixture comprising, for 100 parts by weight, at least 70 parts by weight of the terpolymer (A) and at most 30 parts by weight of at least one copolymer (B) selected from ethylene copolymers comprising:
   from 86 to 93 mol % of ethylene; and
   from 7 to 14 mol % of at least one copolymerizable monomer selected from alkyl (meth)acrylates whose alkyl group has from 1 to 8 carbon atoms; and
   ethylene copolymers comprising:
   92 to 98 mol % of ethylene; and
   from 2 to 8 mol % of at least one $C_3$-$C_{10}$ α-olefin, the said ethylene/α-olefin copolymers having a density in the range of 0.875 to 0.905, the said terpolymer (A) having undergone at least a partial dynamic crosslinking, using a crosslinking agent containing at least one functional group capable of reacting with the anhydride functional group of the said terpolymer (A).

2. Polymer composition according to claim 1, characterized by the fact that the molar ratio of the reactive functional groups of the crosslinking agent to the anhydride groups of the terpolymer (A) is between 0.5 and 2.

3. Polymer composition according to claim 1 characterized by the fact that the propylene polymer is a polymer which has a melt flow index lying between 0.5 to 20 dg/min, measured in accordance with the standard ASTM D1283, at 230° C., under 2.16 kg.

4. Polymer composition according to claim 1 characterized by the fact that the unsaturated dicarboxylic anhydride from which the terpolymers (A) are constituted is selected from maleic anhydride, itaconic anhydride and phthalic anhydride.

5. Polymer composition according to one of claim 1 characterized by the fact that the crosslinking agent contains at least one epoxide functional group.

6. Composition according to claim 5, characterized by the fact that the crosslinking agent is selected from polyepoxide compounds of the general formula:

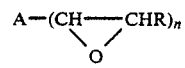

in which A is a polyfunctional group of valence $n \geq 2$ and R is a hydrocarbon radical or a hydrogen atom, and copolymers of at least one $C_2$-$C_8$ olefin with at least one unsaturated monomer containing an epoxy group.

7. Composition according to claim 5, characterized by the fact that the epoxide crosslinking agent is combined with at least one activator of the reaction between its epoxide functional groups and the anhydride functional groups of the terpolymer (A), the molar ratio of the said activating agent to the anhydride groups of the terpolymer (A) being at least equal to 0.5.

8. Composition according claim 1, characterized by the fact that the crosslinking agent contains at least two primary, secondary or primary and secondary amine functional groups.

9. Composition according to claim 8, characterized by the fact that the crosslinking agent is selected from hexamethylenediamine, polyoxyethylenediamines, polyoxypropylenediamines, polyoxypropylenetriamines, diphenylsulphonediamine, and polyamides having free amine functional groups.

10. Composition according to claim 1, characterized by the fact that the crosslinking agent contains at least two alcohol or thiol functional groups or else at least one alcohol or thiol functional group and at least one amine functional group.

11. Composition according to claim 1, characterized by the fact that it contains up to 20 parts by weight, per 100 parts by weight of the total polymers, of at least one filler.

12. Composition according to claim 1, characterized by the fact that it contains up to 30 parts by weight, per 100 parts by weight of the total polymers, of at least one plasticizing oil which is compatible with the ethylene copolymer.

13. Moulded articles obtained from the polymer composition as defined in claim 1.

14. A process for the production of a polymer of claim 1, comprising the steps of simultaneously kneading and heating at a temperature of between 190° C. and 240 ° C., the polymer constituents and the crosslinking agent of claim 1 and any optional additives, wherein the residence time in the kneading step is at greater than two minutes.

* * * * *

UNITED STATES PATENT AND TRADEMARK OFFICE
CERTIFICATE OF CORRECTION

PATENT NO. : 4,990,566

DATED : February 5, 1991

INVENTOR(S) : HERT

It is certified that error appears in the above-identified patent and that said Letters Patent is hereby corrected as shown below:

Claim 5, column 10, line 13, delete "one of".

Claim 8, column 10, line 35, after "according" insert --to--.

Signed and Sealed this

Twenty-third Day of June, 1992

Attest:

DOUGLAS B. COMER

Attesting Officer    Acting Commissioner of Patents and Trademarks